United States Patent [19]

Nakata et al.

[11] Patent Number: 4,560,544
[45] Date of Patent: Dec. 24, 1985

[54] PROCESS FOR THE PREPARATION OF ACICULAR α-FEOOH FOR MAGNETIC RECORDING MATERIALS

[75] Inventors: Kazuo Nakata; Tsuneo Ishikawa, both of Moriyama; Taro Amamoto; Toshihiko Kawamura, both of Kusatsu, all of Japan

[73] Assignee: Ishihara Sangyo Kaisha, Ltd., Osaka, Japan

[21] Appl. No.: 680,241

[22] Filed: Dec. 10, 1984

Related U.S. Application Data

[63] Continuation of Ser. No. 443,888, Nov. 23, 1982, abandoned.

[30] Foreign Application Priority Data

Nov. 27, 1981 [JP] Japan .............................. 56-190166

[51] Int. Cl.$^4$ ............................................ C01G 49/06
[52] U.S. Cl. .................................. 423/266; 423/633; 423/634
[58] Field of Search ............... 423/632, 633, 634, 266; 232/62.56

[56] References Cited

U.S. PATENT DOCUMENTS

4,400,432  8/1983  Buxbaum et al. ................. 252/62.56

FOREIGN PATENT DOCUMENTS

54-37297  3/1979  Japan ................... 423/633

OTHER PUBLICATIONS

Richards et al.: "The Relationship of Switching Distribution to Tape Digital Output", J. Appl. Phys., vol. 49(3), 1978, pp. 1819–1820.
Koester et al.: "Switching Field Distribution and A.C. Bias Recording Parameters", IEEE Trans. on Magnetics, vol. MAG-17, No. 6, Nov. 1981, pp. 2505–2552.
Wilson: "Effect of Switching Field Distributions and Coercivity on Magnetic Recording Properties", IEEE Trans. on Mag., vol. MAG-11, No. 5, Sep. 1975, pp. 1200–1202.

*Primary Examiner*—Jack Cooper
*Attorney, Agent, or Firm*—Cushman, Darby & Cushman

[57] ABSTRACT

A process for preparing acicular α-FeOOH by partially neutralizing and then oxidizing a ferrous salt solution in the presence of phosphoric acid or a salt thereof to form seed crystals of α-FeOOH and optionally further oxidizing said solution while neutralizing said solution with an alkali to grow said seed crystals, wherein pyrophosphoric acid or a salt thereof is used as said phosphoric acid and the seed crystals of α-FeOOH are formed at a temperature of 50° to 100° C. The α-FeOOH obtained according to the process of this invention is composed of fine particles and appreciably improved in acicularity and particle size distribution. Also, a magnetic recording medium made from the magnetic iron oxides derived therefrom in a usual way have a low noise characteristic and, are excellent in coercivity and other magnetic properties.

7 Claims, 3 Drawing Figures

|—1.0µ—| x 30000

|—1.0µ—| x 30000

PROCESS FOR THE PREPARATION OF ACICULAR α-FEOOH FOR MAGNETIC RECORDING MATERIALS

CROSS REFERENCE TO RELATED APPLICATIONS

This application is a continuation of Nakata et al., earlier application Ser. No. 443,888 filed Nov. 23, 1982, now abandoned.

BACKGROUND OF THE INVENTION

1. FIELD OF THE INVENTION

This invention relates to a process for preparing fine acicular α-FeOOH particles, i.e., having a large specific surface area, sharp particle size distribution and, in particular, improved acicularity, such acicular α-FeOOH being intended to serve as a precursor for obtaining ferromagnetic iron oxides which are suitably used as a magnetic recording medium having a low noise characteristic, excellent coercivity and other magnetic properties.

2. DESCRIPTION OF THE PRIOR ART

In relation to the correlation between particle size reduction and product quality, it is known that an improvement of the S-N ratio (S/N) can be attained by increasing the number of the particles in the magnetic medium by means of particle size reduction (see Journal of Audio Engineering Society, Vol. 20, pp. 98–99 (1972)) and that an improvement of the S-N ratio (S/N) can be also realized by the volume reduction of individual particles (see IEEE Transaction on Magnetics, Vol. Mag. 17, No. 6, pp. 3032–3034 (1981)). However, such particle size reduction is attended by various problems, such as (1) lowering of acicularity (axial ratio) due to decrease of a major axis length, (2) lowering of heat resistance of particles in the step of heat treatment, and (3) occurrence of branching and encouraged formation of new nuclei when a growth factor is elevated for increasing the yield in industrial practice, and thus improvements over these problems have been desired.

For the preparation from a ferrous salt of acicular α-FeOOH intended to be used as a precursor for obtaining acicular ferromagnetic iron oxides, there are known roughly the two following types of methods: an acid method in which the α-FeOOH is produced by the precipitation in an acidic region and an alkaline method in which the α-FeOOH is precipitated in an alkaline region. The acidic method is advantageous over the alkaline method in that the former is subject to less restrictions in starting materials as the impurities contained in the starting material ferrous salt are discouraged from being coprecipitated during the reaction and that the former is more economical because of less alkali consumption but, on the other hand, the former involves such problems that the produced α-FeOOH particles might prove unsatisfactory in axial ratio (length/width ratio) and that the particle size distribution tends to be broadened. The axial ratio tends to lower particularly when the preparation reaction is carried out at a temperature above 45° C. Improvement of the axial ratio of the α-FeOOH particles leads to betterment of coercivity due to the geometric anisotropy of the particles as well as improvement of other magnetic properties when a magnetic coating film is produced by using a ferromagnetic iron oxide obtained from said α-FeOOH in a known way, and thus improvements of such axial ratio and particle size distribution have been strongly desired, especially in the acidic method. Many attempts have been made hitherto for the improvement of axial ratio. For instance, Japanese Patent Publication No. 49016/80 proposes the use of γ-FeOOH with better acicularity in place of α-FeOOH, while Japanese Patent Publication No. 23217/80 teaches the addition of Zn ions in the course of formation of α-FeOOH seed crystals, and Japanese Patent Laid-Open No. 127400/78 suggests the preparation of α-FeOOH under a highly alkaline condition. However, these methods, though capable of improving the axial ratio, can hardly be deemed as enough improvements for such reasons that the improvements of other properties are unsatisfactory and the problems are left unsolved in their application to industrial production.

Also, Japanese Patent Publication No. 25546/64 discloses a process in which the precipitation and oxidation of ferrous hydroxide are performed in the presence of phosphate ions at a temperature of up to 50° C. to form the seed crystals and then metallic iron and an oxidizing agent are added to a suspension of said seed crystals to grow the particles of said seed crystals to the extent of reaching 6 to 30 times greater than the total weight thereof to thereby obtain rather stumpy short columnar α-FeOOH particles. In this process, however, only orthophosphoric acid is used as a phosphoric acid and no improvement is provided in the axial ratio of particle.

SUMMARY OF THE INVENTION

The object of the present invention is to provide a process for preparing α-FeOOH which is used as a starting material for producing ferromagnetic iron oxides, said α-FeOOH having a high axial ratio of particle, sharp particle size distribution, minimized amount of branchings, especially small particle diameter and excellent magnetic properties.

DETAILED DESCRIPTION OF PREFERRED EMBODIMENTS

Figure 1:
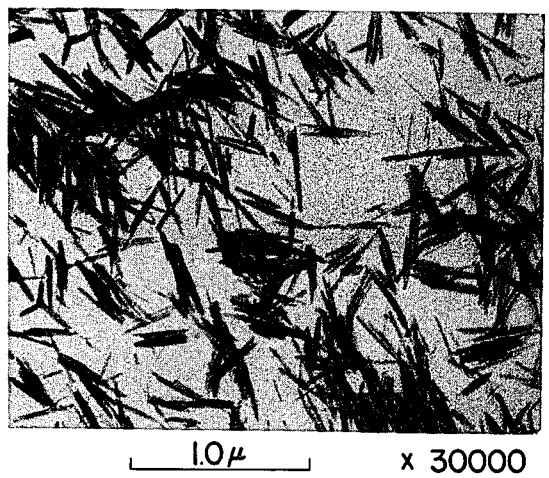
FIGS. 1 to 3 are the electron microphotographs (magnified 30,000 times) of α-FeOOH particles obtained in Examples 1, 3 and 5, respectively, of this invention.

Taking notice of the fact that addition of a phosphoric acid at the time of formation of seed crystals has the effect of making the particle size distribution sharp and arresting generation of branched particles, the present inventors have continued with their studies through the acid method and come up with the following findings: (1) Pyrophosphoric acid, which has not yet been used as the phosphoric acid for the purpose described, has an effect quite contrary to the axial ratio lowering effect of other phosphorus compounds. In the case of using other phosphorus compounds, although favorable effects are provided on the controlling of shape and particle size, inhibition of branching and improvement of particle size distribution, the axial ratio tends to be impaired. But when pyrophosphoric acid or a salt thereof is used, it proves not only effective for controlling of shape and particle size, inhibition of branching and improvement of particle size distribution but also conductive to the betterment of the axial ratio. (2) A better axial ratio is obtained when seed crystals are formed at a low temperature (30°–40° C.) than at a higher temperature, but at the low temperature, long-time oxidation is required for obtaining the seed crystals of a desired particle size, and this tends to broaden the particle size distribution. Use of pyrophosphoric acid or a salt thereof makes it possible to obtain the desired product with a high axial ratio and a sharp particle size distribution at a relatively higher temperature (50°-100° C.), which is easy to control in industrial practice, and in a short period of time. (3) Relating to the stage of growth of seed crystals, it is imperative for providing a sharp particle size distribution to inhibit further nucleation of $\alpha$-FeOOH. For attaining this, application of a low temperature condition (30°-40° C.) must be avoided and it is desirable to effectuate the crystal growth at a relatively higher temperature (50°-100° C.). No difference in reaction temperature between the stages of generation and growth of the seed crystals leads to advantages for control of particle size and for industrial operations. (4) In the case of using pyrophosphoric acid or a salt thereof in the formation of the seed crystals, it is possible to obtain the product with a high axial ratio and a sharp particle size distribution particularly when the growth factor (on weight base) of the seed crystals is within the range of 1.0 to 3.5, preferably 1.5 to 3.5, more preferably 2 to 3.

As described above, it has been found that by using pyrophosphoric acid or a salt thereof as a particle controlling agent in the formation of the seed crystals and by combining both the favorable seed crystal-forming conditions and growing conditions, it is possible to produce, in an industrially advantageous way, the fine particles having a high axial ratio, a sharp particle size distribution and minimized amounts of branchings, and this invention has been attained on the basis of these findings.

Thus, this invention provides a process for preparing acicular $\alpha$-FeOOH particles for magnetic recording materials by partially neutralizing and then oxidizing a ferrous salt solution in the presence of a phosphoric acid or a salt thereof to form $\alpha$-FeOOH particles and, optionally, further oxidizing said solution while neutralizing said solution with an alkali to grow said seed crystals, characterized in that pyrophosphoric acid or a salt thereof is used as said phosphoric acid and the formation of the $\alpha$-FeOOH seed crystals is carried at a temperature of 50° to 100° C.

As the ferrous salt solution used in the process of this invention, there may be employed a ferrous salt solution of a mineral acid such as ferrous sulfate, ferrous nitrate, ferrous chloride and the like, and ferrous sulfate is preferred for industrial practice of this process. As the hydroxide, oxide or carbonate of an alkali metal or alkaline earth metal, there may be used sodium hydroxide, potassium hydroxide, sodium oxide, calcium carbonate and the like, among which sodium hydroxide and potassium hydroxide are preferred for the industrial practice of this process.

Pyrophosphoric acid or a salt thereof used in this process may be properly selected from pyrophosphoric acid, and their alkali metal salts or ammonium salts.

As the oxidizing agent, air, oxygen or other oxidizers may be used, and air is preferred.

In the process of this invention, first a ferrous salt solution is partially neutralized with an alkali and then oxidized to turn a part of Fe in the solution into the seed crystals of $\alpha$-FeOOH. In the course of this process, pyrophosphoric acid or a salt thereof is allowed to exist in the mother solution, in the alkali to be added to the mother solution, or in the admixture solution of ferrous salt and green rust formed after alkali addition and partial oxidation. The concentration of the ferrous salt solution is usually within the range of 30 to 100 Fe g/l, and the amount of pyrophosphoric acid or a salt thereof added to the solution is within the range of 0.05 to 0.8% by weight, preferably 0.1 to 0.6% by weight, as calculated in terms of P based on the amount (weight) of the $\alpha$-FeOOH seed crystal precipitate produced. If the amount of P is below the above-mentioned range, no desired effect resulting from the addition of P is provided and the particle size distribution may be too broadened or branching may occur to make it unable to obtain a required axial ratio. If the amount of P is in excess of said range, the acicular particles of the produced seed crystals may become too small in particle size, necessitating an excessive raise of the growth factor. A small quantity of orthophosphoric acid may exist in the reaction system due to incidental incorporation into pyrophosphoric acid or as a result of hydrolysis of pyrophosphoric acid during the reaction. The amount of such co-existing orthophosphoric acid should be restricted to less than 0.05% by weight in terms of P based on the amount of the precipitated $\alpha$-FeOOH seed crystals.

The process of this invention does not exclude use of other kinds of phosphoric acids or salts thereof, for example, tripolyphosphoric acid or a salt thereof in place of part or the whole of pyrophosphoric acid or a salt thereof, if such phosphoric acid or a salt thereof can be dissociated into pyrophosphoric acid or a salt thereof in the course of the seed crystal-forming reaction but, in such case, orthophosphoric acid or a salt thereof is usually simultaneously produced to coexist in the reaction system, and it is not so easy to control the formation of such orthophosphoric acid or a salt thereof to have it confined within the above-defined amount range.

The amount of the alkali to be added in accordance with the process of this invention is such as required to precipitate Fe ions in the mother solution in an amount of 5 to 25 g/l, preferably 10 to 15 g/l. If the concentration of the produced seed crystals is below the said range, then the production efficiency will be lowered to such an extent that the process becomes unsuited for industrial practice (in the economical sense), and also the produced $\alpha$-FeOOH has an undesirable shape resembling chestnut burrs. If said concentration is too high, then the viscosity of the mother solution will be increased to prevent the uniform oxidation reaction and also the particle size distribution becomes unsteady, resulting in poor magnetic properties of $\gamma$-Fe$_2$O$_3$ which is derived from the $\alpha$-FeOOH.

It is important to keep the reaction temperature above 40° C. in this seed crystal-forming stage. Since the reaction is usually carried out in an aqueous system, the reaction temperature is controlled at 50° to 100° C., preferably 50° to 70° C. If this reaction temperature is below the said range, the produced seed crystals will tend to become too small in particle size, so that a long reaction time is required to obtain the desired particle size, resulting in a dulled particle size distribution. It is to be also noted that at a reaction temperature above 80° C., granular magnetite will tend to be formed. The pH of the reaction solution is usually maintained at 3 to 8.

During this seed crystal-forming stage, for the purpose of preventing the incidental incorporation of $\gamma$-FeOOH, the ratio of Fe ions precipitated by the neutralization to the total amount of Fe ions in the mother solution (also referred to as a neutralization precipitation ratio) should be not higher than 70%, and also the concentration of $Fe^{++}$ dissolved in the solution at the time of formation of seed crystals should be 40 g/l or above, preferably 50 g/l or above. If said $Fe^{++}$ concentration is outside the above-defined range, there may occur the undesirable phenomena such as formation of branched particles. It is advised to complete this seed crystal-forming reaction as fast as possible. Usually it is found expedient to control the reaction such that it will be completed in about 10 to 80 minutes. It is also desirable that the obtained seed crystals will have a BET specific surface area of about 50 to 100 m²/g.

The solution which has gone through said seed crystal-forming reaction is the ferrous salt solution in which the α-FeOOH seed crystals are suspended, and pyrophosphoric acid or a salt thereof in the solution is either trapped in the seed crystals or adsorbed strongly to the surfaces thereof, so that usually there remains no pyrophosphoric acid or a salt thereof in an isolated state in the solution. In the process of this invention, the solution in which the seed crystals are suspended may be subject to further oxidizing while adding an alkali to grow the seed crystals to thereby obtain the intended α-FeOOH. In this step, a phosphorus compound, etc., may be introduced as a crystallization havitator or heat resistance agent.

It has been found expedient to carry out this reaction at a temperature of 50° to 100° C. as in the case of the above-described seed crystal-forming reaction for obtaining a product having a high axial ratio and a sharp particle size distribution in an industrially advantageous way. The solution is oxidized while adding the same alkali as used in the foregoing reaction step so as to maintain a pH value substantially constant at a fixed value of 3 to 6. The seed crystal growth rate is preferably adjusted to the range of about 5 to 15 g/l/hr (calculated in terms of α-FeOOH) for minimizing the breadth of the particle size distribution of the product and for obtaining the acicular particles with little branching. Also, the α-FeOOH seed crystals are grown so that the growth factor on weight base of said crystals will be within the range of 1.0 to 3.5, preferably 1.5 to 3.5, more preferably 2 to 3, by conducting the crystal growing reaction. If this growth factor is high above the said range, the product expands the particle size distribution width and also encourages branching of the particles. In view of the desired dispersibility of the particles in the recording medium and the consumption efficiency of raw materials such as a ferrous compound, the growth factor is preferably in the range of 1.5 to 3.5, more preferably 2 to 3. The reaction in this step is preferably carried out so that the produced α-FeOOH will have a BET specific surface area of, for example, 35 to 60 m²/g.

α-FeOOH obtained according to the process of this invention has a sharp particle size distribution, is minimized in branching and has an axial ratio as high as 10 to 18, and further, the magnetic iron oxides derived therefrom, the cobalt-coated version thereof and the magnetic tapes manufactured therefrom all have the good magnetic properties.

The thus produced α-FeOOH is subjected to ordinary filtration, washing with water, drying and pulverization to provide a powder of α-FeOOH. This powdery α-FeOOH can be worked into γ-Fe₂O₃ in a usual way, that is, said substance is first dehydrated in air at a temperature of 300° to 700° C., then this dehydrated substance is reduced with hydrogen or steam-containing hydrogen at a temperature of 300° to 500° C. to form $Fe_3O_4$ and the latter is further oxidized with oxygen or with air at a temperature of 200° to 400° C. to obtain γ-$Fe_2O_3$. As an effective means for further bettering the magnetic properties of γ-$Fe_2O_3$, it is suggested to treat α-FeOOH obtained from the process of this invention with phosphoric acid, a phosphate, a silicate or the like before the dehydration treatment.

This invention is further illustrated with reference to some embodiments below.

EXAMPLE 1–3

20 Liters of an aqueous solution of $FeSO_4$ with a ferrous ion concentration of 70 g/l was fed into a reactor provided with an air blow-in pipe and a stirrer and the solution was heated to 60° C. While maintaining this solution temperature, a predetermined amount of a phosphorus compound shown in Table 1 and 2.14 liters of an NaOH solution (concentration: 5 mol/l) were added to the solution under stirring (precipitated Fe: 15 g/l; Fe concentration in the solution: 55 g/l) and then air was blown thereinto at a rate of 100–60 l/hr, and the reaction was carried out for about one hour to obtain α-FeOOH. Thus, three samples were obtained (Samples A–C).

EXAMPLE 4

The reaction process of Example 1 was repeated, except that the reaction temperature of 40° C. was used to obtain α-FeOOH (Sample D).

EXAMPLE 5

The procedure of Example 1 was repeated without adding pyrophosphoric acid to obtain α-FeOOH (Sample E).

EXAMPLE 6

The process of Example 1 was carried out, except that the aqueous solution of $FeSO_4$ having a ferrous ion concentration of 70 g/l used in Example 1 was replaced by an aqueous solution of $FeSO_4$ having a ferrous ion concentration of 50 g/l and the Fe concentration in the solution was adjusted to 35 /gl, not 55 g/l to thereby obtain α-FeOOH (Sample F).

Each of the thus obtained Samples A–F was subjected to measurements of an axial ratio (L/W) in a usual way with an electron microscope and a specific surface area (SS) by the BET method. The particle size distribution ($\sigma L/\overline{L}$) of each said sample was also measured by the following method. The results are shown in Table 1.

Measurement of particle size distribution ($\sigma L/\overline{L}$)

The well dispersed α-FeOOH particles were used as specimens. The particle diameters along the major axis of more than 3,000 particles were read by an electron microscope and their arithmetic mean axial length $\overline{L}(\mu)$ and standard deviation $\sigma L(\mu)$ were determined, and the particle size distribution was given by the following formula:

Particle size distribution = $\sigma L/\overline{L}$

Each of said Samples A–F was subjected to a heat resisting treatment in a known way and then dehydrated in air at 650° C., reduced in steam-containing hydrogen at 420° C. and again oxidized in air at 280° C., all in the usual ways, to obtain $\gamma$-$Fe_2O_3$. The specific surface area (SS) and coercivity (Hc) of each of the thus obtained $\gamma$-$Fe_2O_3$ specimens were measured by using the BET method for the specific surface area and a usual method for the coercivity. The results are shown in Table 2.

Further, by using each of said $\gamma$-$Fe_2O_3$ specimens, there was prepared a blend of the following composition and this blend was dispersed in a ball mill to produce a magnetic coating material.

| Blend composition | |
|---|---|
| (1) $\gamma$-$Fe_2O_3$ powder | 100 parts by weight |
| (2) Soybean lecithin | 1.6 " |
| (3) Surfactant | 4 " |
| (4) Vinyl acetate-vinyl chloride copolymer resin | 10.5 " |
| (5) Dioctyl phthalate | 4 " |
| (6) Methyl ethyl ketone | 84 " |
| (7) Toluene | 93 " |

Each of the thus produced magnetic coating materials was applied to a polyester film, oriented and dried in the ordinary ways to make a magnetic recording medium having an approximately 7$\mu$ thick magnetic coating film. Each of the thus obtained magnetic recording media was subjected to measurements of coercivity (Hc), remanent induction (Br), squareness (Br/Bm), orientability (OR) and switching field distribution (SFD) by the known methods to obtain the results shown in Table 2.

TABLE 1

| | | Phosphorus compound added | | $\alpha$-FeOOH | | |
|---|---|---|---|---|---|---|
| | Sample | Compound | Amount added (% P) | $\sigma$L/L | SS | L/W |
| Example 1 | A | Pyrophosphoric acid | 0.2 | 0.31 | 59 | 15–16 |
| Example 2 | B | Pyrophosphoric acid | 1.0 | 0.23 | 85 | 10–11 |
| Example 3 | C | Orthophosphoric acid | 0.2 | 0.26 | 54 | 8–9 |
| Example 4 | D | Pyrophosphoric acid | " | 0.34 | 87 | 14–15 |
| Example 5 | E | None | — | 0.43 | 50 | 14–15 |
| Example 6 | F | Pyrophosphoric acid | 0.2 | 0.37 | 56 | 15–16 |

TABLE 2

| | Sample | $\gamma$-$Fe_2O_3$ powder | | Tape evaluations | | | |
|---|---|---|---|---|---|---|---|
| | | SS | Hc (Oe) | Hc (Oe) | Br (Gauss) | Br/Bm | OR | SFD |
| Example 1 | A | 36 | 378 | 375 | 1250 | 0.82 | 2.3 | 0.35 |
| Example 2 | B | 46 | 340 | 337 | 960 | 0.71 | 1.5 | 0.43 |
| Example 3 | C | 34 | 358 | 351 | 1260 | 0.74 | 1.6 | 0.46 |

TABLE 2-continued

| | Sample | $\gamma$-$Fe_2O_3$ powder | | Tape evaluations | | | |
|---|---|---|---|---|---|---|---|
| | | SS | Hc (Oe) | Hc (Oe) | Br (Gauss) | Br/Bm | OR | SFD |
| Example 4 | D | 43 | 327 | 330 | 1030 | 0.72 | 1.5 | 0.44 |
| Example 5 | E | 30 | 403 | 378 | 1150 | 0.77 | 1.8 | 0.49 |
| Example 6 | F | 33 | 360 | 362 | 1170 | 0.80 | 1.9 | 0.40 |

Figure 2:
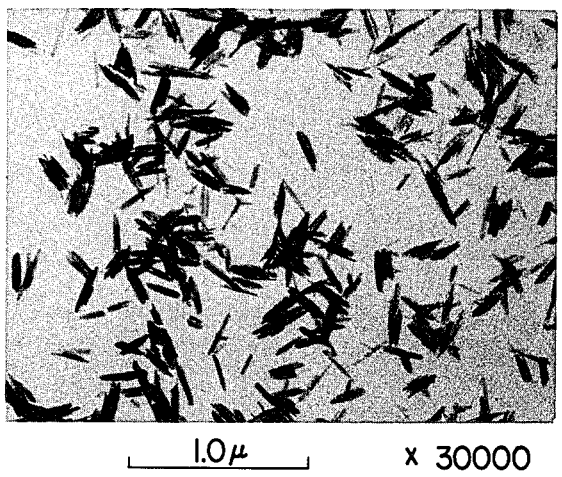
Figure 3:

The electron microphotographs (magnified 30,000 times) of $\alpha$-FeOOH Samples A, C and E obtained in said Examples 1, 3 and 5 are annexed herein as FIGS. 1, 2 and 3, respectively. It is apparent that the product obtained according to the process of this invention (FIG. 1) is composed of the fine particles with good acicularity and uniform particle size distribution.

EXAMPLE 7–13

20 liters of an aqueous solution of $FeSO_4$ having a ferrous ion concentration of 70 g/l was fed into a reactor provided with an air blow-in pipe and a stirrer, and the solution was heated to each of the predetermined temperature shown in Table 3. While maintaining this temperature, a predetermined amount of each of the phosphorus compound shown in Table 3 and 2.14 liters of an aqueous solution of NaOH (concentration: 5 mol/l) were added under stirring (precipitated Fe: 15 g/l; Fe concentration in the solution: 55 g/l). Then air was blown into the solution at a rate of 100–60 l/hr and the materials present were reacted for about one hour to obtain seed crystals of $\alpha$-FeOOH.

The solution which has gone through said seed crystal-forming reaction was heated to each of the predetermined temperature shown in Table 3, and while blowing air into the solution at a rate of about 600 l/hr, an aqueous solution of NaOH (concentration: 5 mol/l) was added gradually so as to maintain the pH of the reaction solution at 3.5 to 5.5 and the reaction was continued until the seed crystals grew to the predetermined factors shown in Table 3 (growth factor on weight basis) to obtain $\alpha$-FeOOH (Samples G–M).

EXAMPLE 14–15

The process of Example 7 was repeated, except that the aqueous solution of $FeSO_4$ having a ferrous ion concentration of 70 g/l used in Example 7 was replaced by an aqueous solution of $FeSO_4$ having a ferrous ion concentration of 60 g/l or 50 g/l and that the Fe concentration in the solution of 45 g/l or 35 g/l, not 55 g/l, was used to thereby obtain $\alpha$-FeOOH (Samples N and O).

EXAMPLE 16

The process of Example 7 was repeated without adding pyrophosphoric acid to obtain $\alpha$-FeOOH (Sample P).

TABLE 3

| | | $\alpha$-FeOOH seed crystal forming reaction | | | | Seed crystal growth reaction | |
|---|---|---|---|---|---|---|---|
| | | Phosphorus compound added | | Reaction temp. (°C.) | Fe concentration in solution (g/l) | Reaction temperature (°C.) | Growth factor |
| | Sample | Compound | Amount added (% P) | | | | |
| Example 7 | G | Pyrophosphoric acid | 0.2 | 50 | 55 | 60 | 2 |
| Example 8 | H | Pyrophosphoric acid | 0.4 | " | " | " | 3 |
| Example 9 | I | Pyrophosphoric | 0.6 | " | " | " | " |

TABLE 3-continued

| | | α-FeOOH seed crystal forming reaction | | | | Seed crystal growth reaction | |
|---|---|---|---|---|---|---|---|
| | | Phosphorus compound added | | Reaction temp. (°C.) | Fe concentration in solution (g/l) | Reaction temperature (°C.) | Growth factor |
| | Sample | Compound | Amount added (% P) | | | | |
| Example 10 | J | Pyrophosphoric acid | 0.2 | 70 | " | 70 | 1.5 |
| Example 11 | K | Pyrophosphoric acid | " | 50 | " | 60 | 4 |
| Example 12 | L | Orthophosphoric acid | 0.2 | " | " | " | 2 |
| Example 13 | M | Pyrophosphoric acid | " | 40 | " | " | " |
| Example 14 | N | Pyrophosphoric acid | " | 50 | 45 | " | " |
| Example 15 | O | Pyrophosphoric acid | " | " | 35 | " | " |
| Example 16 | P | None | — | " | 55 | " | " |

The axial ratio (L/W), specific surface area (SS) by the BET method, and particle size distribution (σL/L) were measured for each of said Samples G to P in the same way as in Example 1 to obtain the results shown in Table 4.

TABLE 4

| | Sample | α-FeOOH seed crystals (SS) | α-FeOOH σL/L | SS | L/W |
|---|---|---|---|---|---|
| Example 7 | G | 64 | 0.32 | 48 | 14–15 |
| Example 8 | H | 82 | 0.31 | 58 | 13–14 |
| Example 9 | I | 95 | 0.27 | 52 | 12–13 |
| Example 10 | J | 51 | 0.33 | 46 | 14–15 |
| Example 11 | K | 64 | 0.45 | 36 | 14–15 |
| Example 12 | L | 60 | 0.32 | 43 | 8–9 |
| Example 13 | M | 83 | 0.35 | 71 | 14–15 |
| Example 14 | N | 58 | 0.35 | 47 | 14–15 |
| Example 15 | O | 61 | 0.44 | 44 | 14–15 |
| Example 16 | P | 49 | 0.54 | 39 | 13–14 |

Specimens of γ-Fe$_2$O$_3$ were prepared from said respective Samples G–P after the procedure of Example 1 and their coercivity (Hc) and a specific surface area (SS) by the BET method were measured. Also, specimens of magnetic recordium medium were produced therefrom in the same way as in Example 1 and their coercivity (Hc), remanent induction (Br), squareness (Br/Bm), orientability (OR) and switching field distribution (SFD) were measured. The results are shown in Table 5.

TABLE 5

| | Sample | γ-Fe$_2$O$_3$ powder SS | HC (Oe) | Hc (Oe) | Br (Gauss) | Br/Bm | OR | SFD |
|---|---|---|---|---|---|---|---|---|
| Example 7 | G | 28 | 463 | 427 | 1510 | 0.86 | 2.7 | 0.28 |
| Example 8 | H | 33 | 446 | 397 | " | 0.84 | 2.4 | 0.33 |
| Example 9 | I | 32 | 427 | 413 | 1560 | " | " | 0.29 |
| Example 10 | J | 27 | 423 | 408 | 1540 | 0.85 | 2.5 | 0.34 |
| Example 11 | K | 20 | 431 | 392 | 1470 | 0.86 | 2.6 | 0.38 |
| Example 12 | L | 21 | 420 | 398 | 1540 | " | " | 0.31 |
| Example 13 | M | 37 | 362 | 341 | 1230 | 0.74 | 1.6 | 0.43 |
| Example 14 | N | 29 | 440 | 402 | 1520 | 0.85 | 2.5 | 0.34 |
| Example 15 | O | 26 | " | 403 | 1490 | " | " | 0.38 |
| Example 16 | P | 24 | 427 | " | 1410 | 0.82 | 2.2 | 0.40 |

As seen from the above table, γ-Fe$_2$O$_3$ derived from α-FeOOH obtained according to the process of this invention is specified by a large specific surface area and is found effective for noise reduction which is keenly required lately and also improved in magnetic properties.

What is claimed is:

1. A process for preparing acicular α-FeOOH particles for use in the preparation of a magnetic recording material by partially neutralizing and then oxidizing a ferrous salt soltuion in the presence of a phosphoric acid or a salt thereof to form seed crystals of α-FeOOH, and then further oxidizing said solution while neutralizing said solution with an alkali to effect growth of the seed crystals, wherein the seed crystals are formed at a temperature of 50° to 100° C. by using pyrophosphoric acid or a salt thereof as said phosphoric acid in an amount of 0.05 to 0.8% by weight as calculated in terms of P based on the amount of the α-FeOOH produced, and the partial neutralization of the solution is such that the concentration of the ferrous ions in the solution at the time of the seed crystal formation is 40 g/l or higher, and said seed crystals of α-FeOOH are grown 1.0 to 3.5 times greater than the total initial weight thereof at a temperature of 50° to 100° C. wherein the particle size distribution of the α-FeOOH is lower than the α-FeOOH prepared as above but where the concentration of the ferrous ions after the partial neutralization of the solution and at the time of seed crystal formation is less than 40 g/l.

2. The process of claim 1, wherein said seed crystals of α-FeOOH are grown 1.5 to 3.5 times greater than the total initial weight thereof.

3. The process of claim 1, wherein said seed crystals of α-FeOOH are grown 2 to 3 times greater than the total initial weight thereof.

4. The process of claim 1, wherein the seed crystals are formed while maintaining the solution temperature at 50° to 70° C.

5. The process of claim 1, wherein the seed crystals are formed by adding an alkali in an amount necessary for precipitating 5 to 25 g/l of Fe ions.

6. The process of claim 1, wherein the seed crystals are grown at a rate of 5 to 15 g/l/hr, based upon α-FeOOH.

7. The process of claim 1, wherein the seed crystals are grown while maintaining a pH of the solution at 3 to 6.

* * * * *